United States Patent [19]
Williams et al.

[11] Patent Number: 6,022,231
[45] Date of Patent: Feb. 8, 2000

[54] PRE-BUSSED RIGID CONDUIT ELECTRICAL DISTRIBUTION SYSTEM

[75] Inventors: Patrick Williams, Raleigh, N.C.;
Rodney J. West, Liberty, Ind.;
Anthony S. Locker, Cincinnati, Ohio;
Daniel G. Witt, Camden, Ohio; Daniel L. Wittmer, Fairfield, Ohio

[73] Assignee: Square D Company, Palatine, Ill.

[21] Appl. No.: 09/065,832

[22] Filed: Apr. 24, 1998

[51] Int. Cl.$^7$ ....................................................... H01R 4/60
[52] U.S. Cl. ............................................. 439/207; 439/210
[58] Field of Search .................................. 439/207, 210, 439/213, 629, 654, 271, 272, 273, 274, 275, 162, 163, 164, 115

*Primary Examiner*—Alexander Gilman
*Attorney, Agent, or Firm*—David R. Stacey; Larry I. Golden; Larry T. Shrout

[57] ABSTRACT

A sectionalized electrical distribution feeder system for carrying electrical power from a source point to a use point or a distribution point. Each section of the distribution system includes a cylindrical enclosure capable of being easily cut with a handsaw. The enclosure also provides support and protection from physical damage to a plurality of electrical conductors that are disposed within the enclosure. The conductors are held firmly in place by a continuous electrically insulating support that snugly fits inside the enclosure. Each conductor can be easily cut with a metal cutting hand saw, and is enclosed in an electrically insulating sheath, a portion of which can be removed from a newly cut end to provide a contact surface. A joint connecting member is provided for electrically connecting the conductors of adjacent sections of the electrical distribution feeder system. The joint connecting member includes a provision for linear expansion of the sections due to normal operating temperatures of the distribution system. A joint cover connects the two adjacent enclosures together and provides additional protection for the joint connecting member.

25 Claims, 12 Drawing Sheets

6,022,231

PRE-BUSSED RIGID CONDUIT ELECTRICAL DISTRIBUTION SYSTEM

FIELD OF THE INVENTION

This invention relates to electrical distribution systems for use in industrial and commercial locations and more particularly to the electrical connections between adjacent sections of the electrical distribution system.

BACKGROUND OF THE INVENTION

In the past, industrial and commercial electrical distribution feeder systems have generally employed cable and conduit, cable and cable tray, or electrical busway. Where cable is used with conduit, the conduit must first be installed and then cables are pulled through it to complete the installation. Cable used with cable tray or wireway again involves the installation of the cable tray first and then laying of cables in the tray or wireway to complete the installation. Busway installations are generally simpler than cable and conduit, cable and tray or cable and wireway since the conductors are already inside the protective enclosure and require no additional labor after the enclosure is installed. Busway designs of the past have generally included a number of bus bars having a rectangularly shaped cross-section placed parallel to one another and installed in a rectangularly shaped enclosure. The sections of busway are produced in specific lengths that can not be altered in the field during installation. For this reason, if special lengths are required they must be engineered and manufactured at the factory. This special engineering and manufacturing requires additional time for shipment to the job site and generally an increase in cost to the customer.

SUMMARY OF THE INVENTION

The present invention provides an alternative to cable and conduit, cable and tray, and busway designs for electrical distribution systems.

In one embodiment of the present invention, an electrical distribution system includes one or more lengths of a generally cylindrical tubular enclosure that can be similar in construction to conventional metallic conduit. Disposed within the enclosure is a plurality of substantially rigid electrical conductors. A continuous support member is disposed within the enclosure to support the electrical conductors and maintain electrical spacings.

Other features and advantages of the invention will become apparent to those skilled in the art upon review of the following detailed description, claims and drawings.

This application is for an invention that is an improvement of the inventions disclosed in U.S. Pat. Nos. 5,484,300 and 5,266,044, which are assigned to the assignee of the present application and are incorporated herein by reference.

Figure 1:
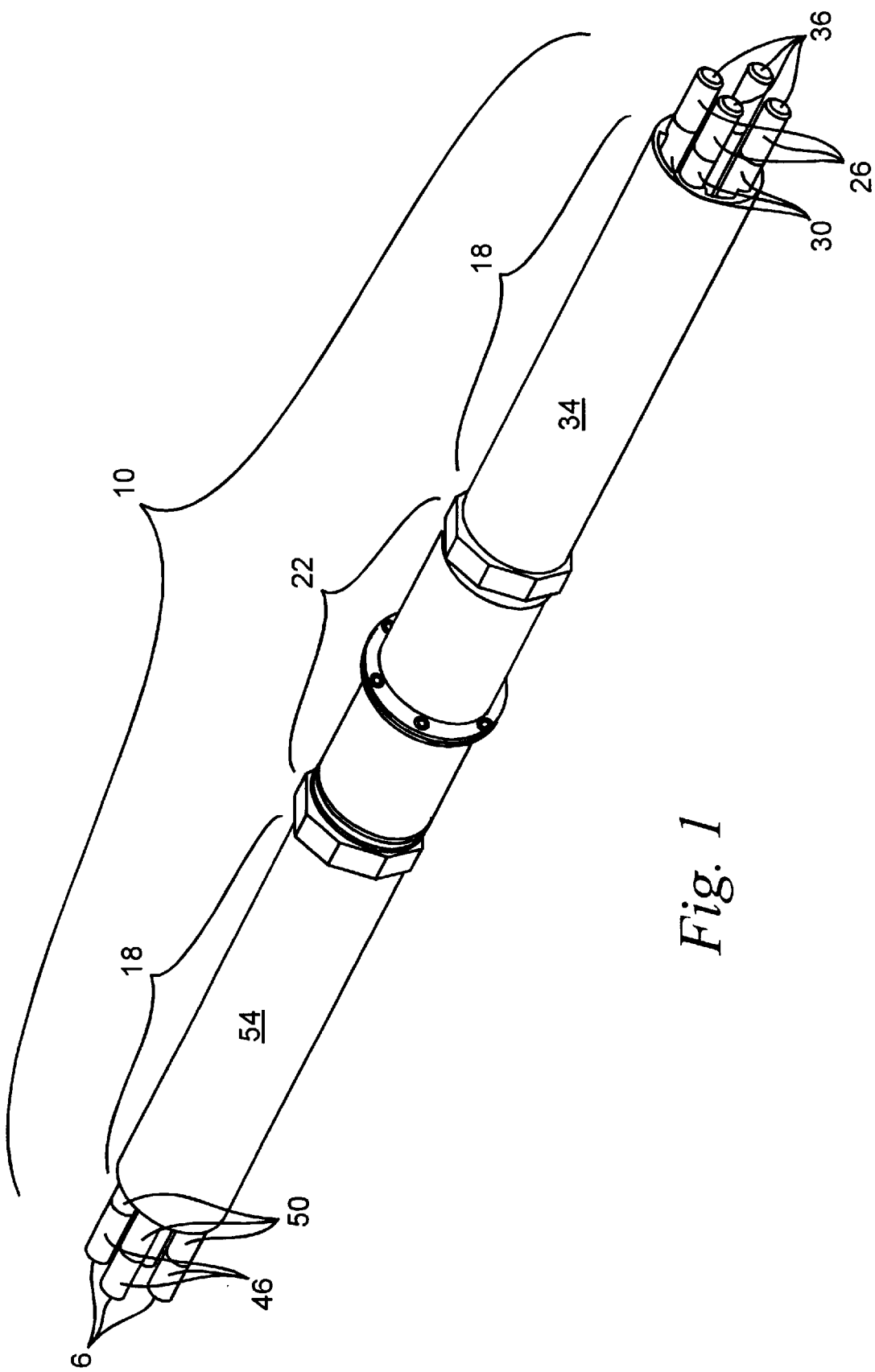
FIG. 1 is an isometric view of two adjacent sections of a sectionalized electrical distribution system of the present invention electrically and mechanically connected together by a joint connector of the present invention.

Before one embodiment of the invention is explained in detail, it is to be understood that the invention is not limited in its application to the details of construction in the following description or illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE INVENTION

FIG. 1 generally illustrates a pre-bussed rigid conduit electrical distribution system 10 wherein a first section 14 of pre-bussed rigid conduit is electrically and mechanically connected to a second section 18 of pre-bussed rigid conduit by a connector 22. Pre-bussed rigid conduit of the present invention can be of a standard unalterable length as will be described with reference to the first section 14 in FIGS. 2, 3 and 4 or of a field modifiable length as described with reference to the second section 18 in FIGS. 5, 6 and 7. The first section 14 includes a plurality of substantially rigid electrical conductors 26, each surrounded by an electrically insulating sheath 30. The conductors 26 are slidably received within a substantially rigid enclosure 34 such that an equal portion of each conductor 26 extends beyond the ends of the enclosure 34 forming male connectors 36. The enclosure 34 extends along a longitudinal axis between a first end region 38 and a second end region 42. The second section 18 also includes a plurality of substantially rigid electrical conductors 46, each surrounded by an electrically insulating sheath 50. The conductors 46 are slidably received within a substantially rigid enclosure 54 such that an equal portion of each conductor 46 extends beyond the ends of the enclosure 54 forming male connectors 56. The enclosure 54 extends along a longitudinal axis between a first end region 58 and a second end region 62.

Figure 2:
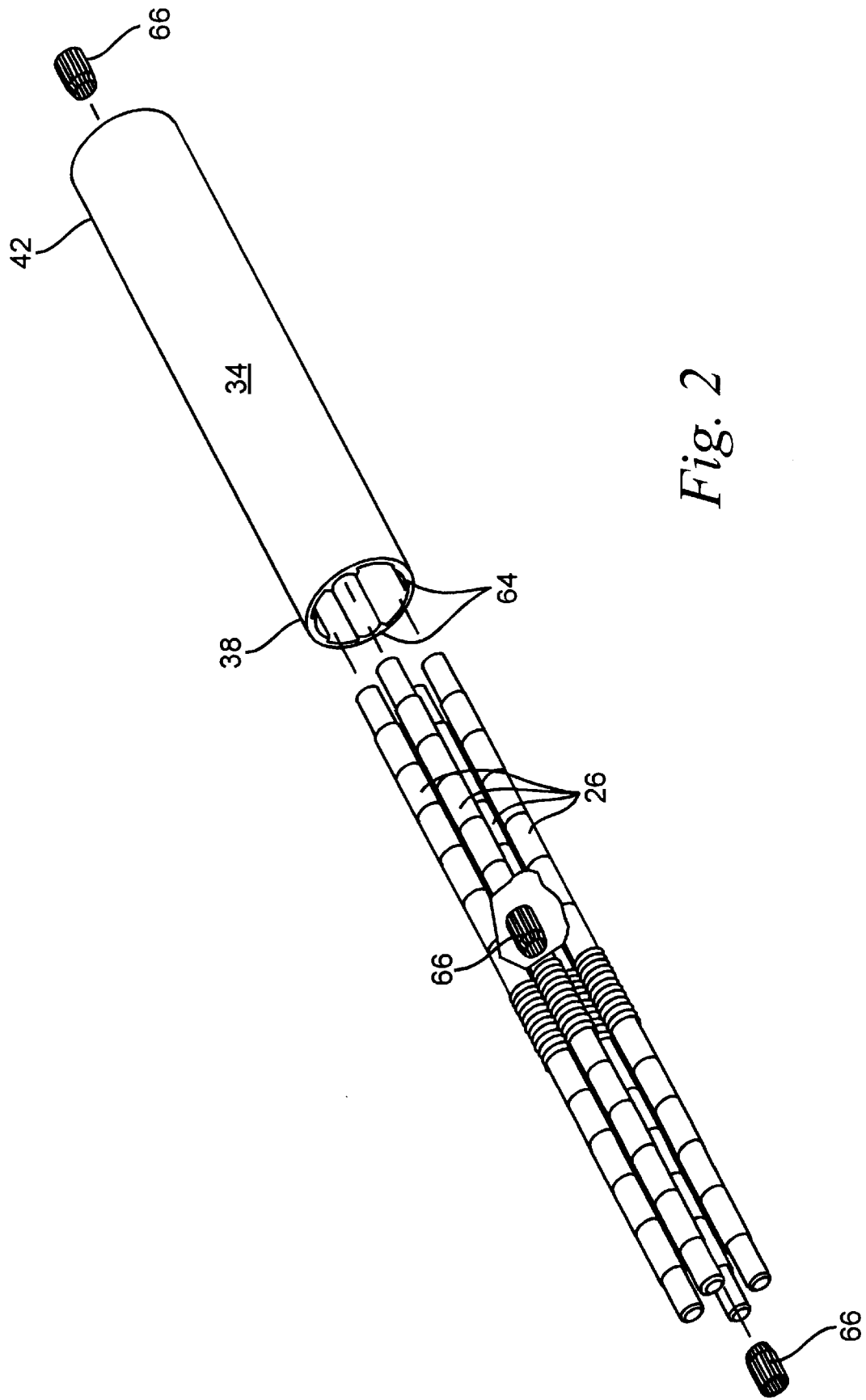
FIG. 2 is an exploded view of a standard section of the sectionalized electrical distribution system of the present invention.
Figure 3:
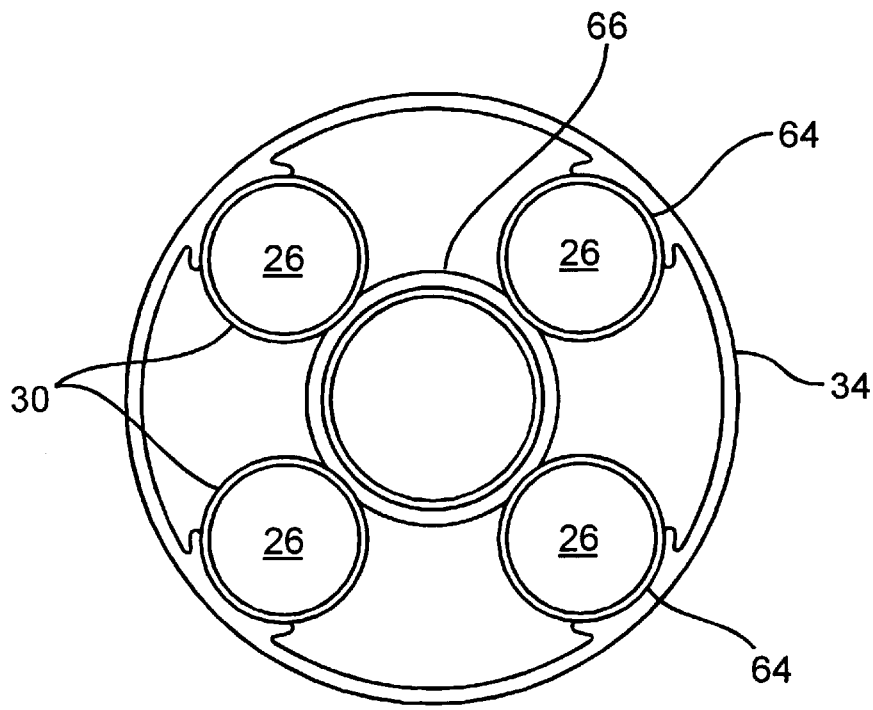
FIG. 3 is an end view of a standard section of the sectionalized electrical distribution system prior to inserting a foam conductor support in accordance with the present invention.
Figure 4:
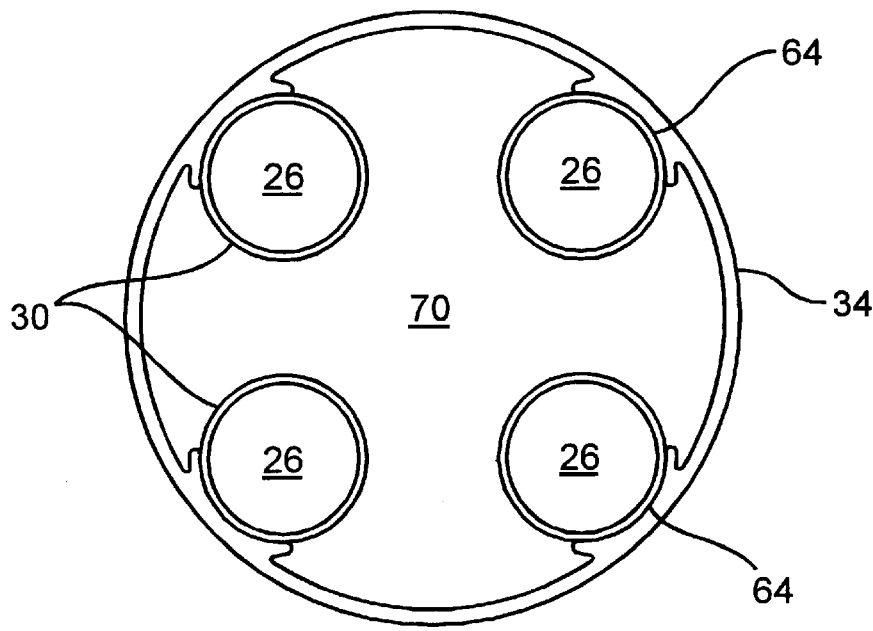
FIG. 4 is an end view of a standard section of the sectionalized electrical distribution system after the foam conductor support has been foamed in place in accordance with the present invention.

Referring now to FIGS. 2, 3 and 4, a first section 14 of the pre-bussed rigid conduit electrical distribution system 10 that does not have a field alterable length is shown. The enclosure 34 includes a number of integrally formed pockets 64 extending longitudinally between the first and second end regions, 38 and 42, respectively. The pockets 64 are arranged in the enclosure 34 such that the enclosure 34 has a uniform cross-section along its entire length. Each pocket 64 receives one of the conductors 26 such that the conductors 26 and the extending male connectors 36 form a pattern that is also uniform in cross-section along the entire length of the first section 14. After the conductors 26 are placed inside the enclosure 34, a preliminary support member, which consists of a number of generally tubular plugs 66, is snugly but slidably received within the enclosure 34 along its longitudinal axis. The plugs 66 simultaneously engage all of the conductors 26, thereby forcing them outwardly into the pockets 64. At this point a permanent support member 70 is placed within the enclosure 34. The permanent support member 70 is a closed cell foam material that is foamed in place within the enclosure 34 such that it provides a continuous support for the conductors 26 along the entire length of the enclosure 34. Since the permanent support member 70 is foamed in place, it forms a bond between the conductors 26 and the enclosure 34, preventing any movement of the conductors 26 with respect to the enclosure 34.

Figure 5:
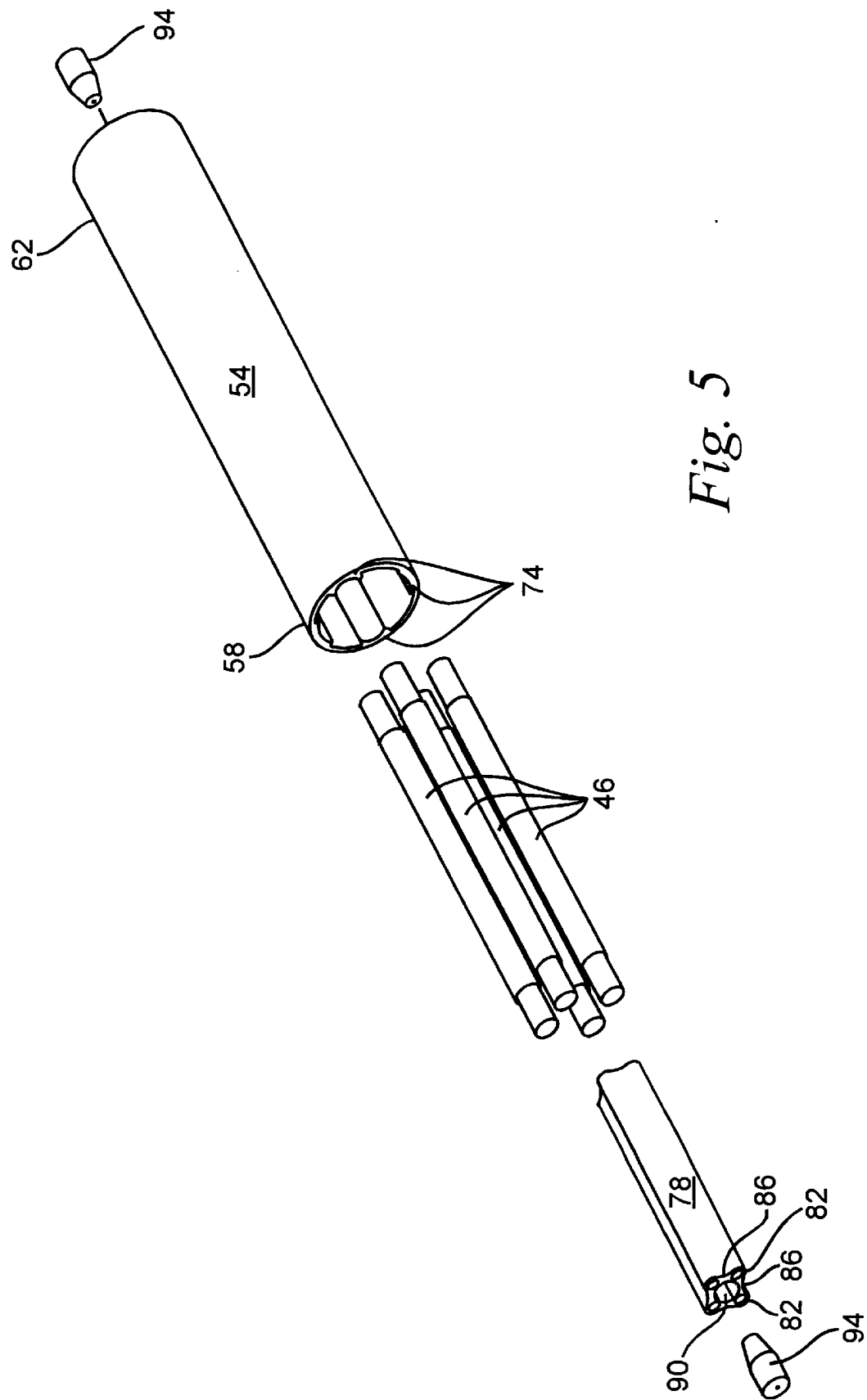
FIG. 5 is an exploded view of a field modifiable section of the sectionalized electrical distribution system of the present invention.
Figure 6:
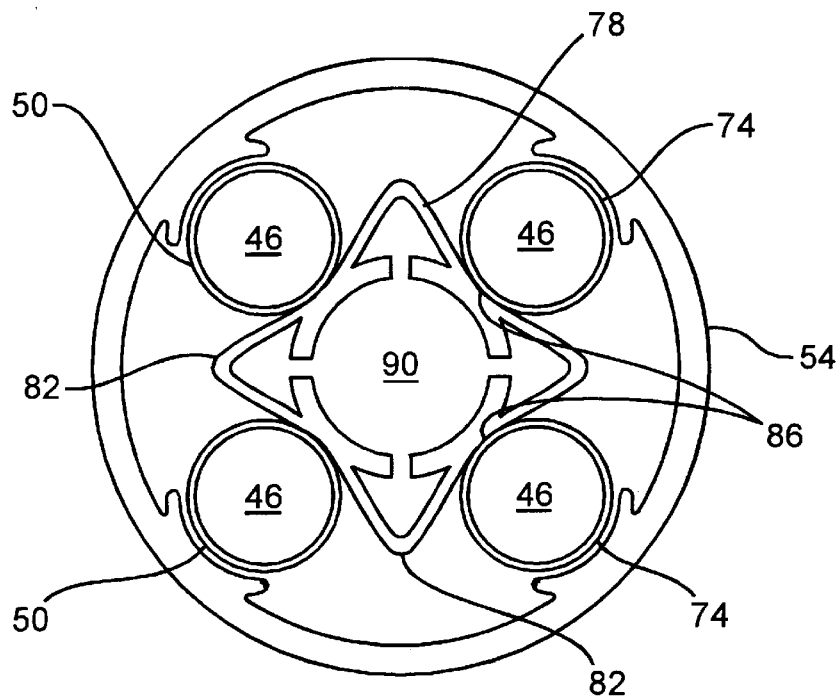
FIG. 6 is an end view of the field modifiable section of FIG. 5 prior to installing a plug in accordance with the present invention.
Figure 7:
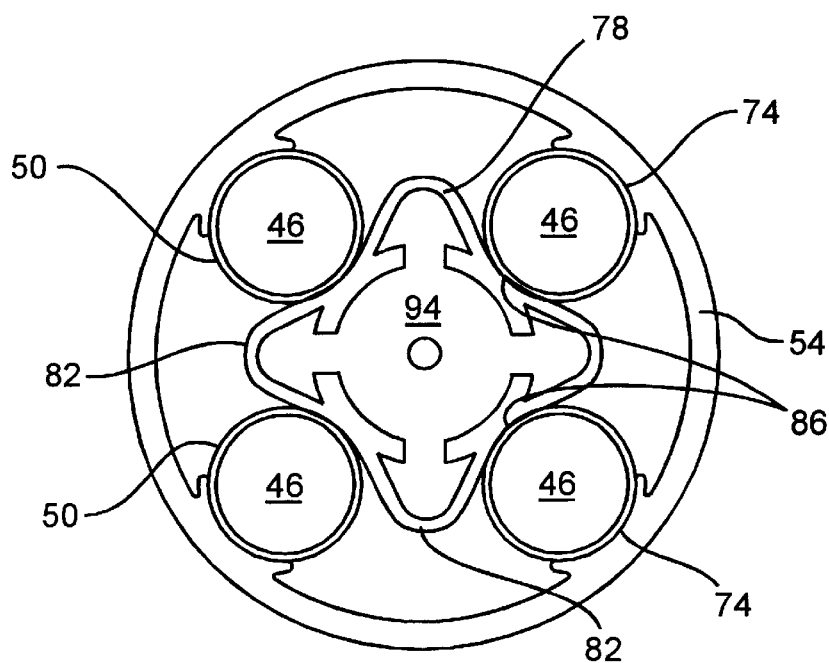
FIG. 7 is an end view of the field modifiable section of FIG. 5 after installing a plug in accordance with the present invention.

Referring now to FIGS. 5, 6 and 7, a second section 18 that does have a field alterable length is shown. The enclosure 54 includes a number of integrally formed pockets 74 extending longitudinally between the first and second end regions, 58 and 62, respectively. The pockets 74 are arranged in the enclosure 54 such that the enclosure 54 has a uniform cross-section along its entire length. Each pocket 74 receives one of the conductors 46 such that the conductors 46 and extending male connectors 56 form a pattern that is also uniform in cross-section along the entire length of the second section 18. After the conductors 46 are placed inside the enclosure 54, a substantially rigid support member 78 is slidably received within the enclosure 54 along its longitudinal axis. The support member 78 has a perimeter structure that comprises a number of alternating peaks 82 and valleys 86 corresponding to the number of conductors 46. The perimeter structure further defines a hollow interior 90 that extends along its longitudinal axis. One conductor 46 nests in each valley 86 which provides continuous support along the length of the enclosure 54 while each peak 82 separates adjacent conductors 46 one from the other. Preferably, the support member 78 is extruded such that it is substantially rigid along its longitudinal axis but is selectively expandable in circumference. In its normal state, its circumference is such that it can be easily received within the enclosure 54 after the conductors 46 have been installed. In this state the conductors 46 can be moved longitudinally with respect to the enclosure 54. A plug 94 is pushed into the hollow interior 90 at each end of the support member 78 causing the support member 78 to expand in circumference, forcing the conductors 46 into the pockets 74. This effectively locks the conductors 46 in place, thereby preventing longitudinal movement of the conductors 46 with respect to the enclosure 54.

To alter the length of a field modifiable section of pre-bussed rigid conduit, such as second section 18, the plugs 94 are removed from the hollow interior 90 of the support member 78, thereby permitting the conductors 46 to be moved longitudinally with respect to the enclosure 54. The conductors 46 are then moved longitudinally until they are even with one end of the enclosure 54. The plugs 94 are reinstalled within the hollow interior 90 of the support member 78 to prevent longitudinal movement of the conductors 46 with respect to the enclosure 54. The desired enclosure length is then measured from the end of the enclosure 54 from which the conductors 46 extend. Measuring from this end will automatically place the conductors 46 at the proper position for cutting. The enclosure 54 is marked at the desired length. Then, using a hacksaw or similar tool, the enclosure 54, conductors 46 and support member 78 are simultaneously cut off generally perpendicular to the longitudinal axis of the enclosure 54 at the mark. The plug 94 is again removed from the hollow interior 90 of the support member 78 to permit longitudinal movement of the support member 78 and conductors 46 with respect to the enclosure 54. The cut end of the enclosure 54 is deburred to remove any sharp edges caused by cutting. The insulating sheath 50 is removed from a portion of the cut end of each conductor 46, providing a contact surface. The cut end of each conductor 46 is chamfered, thereby removing any sharp burrs and providing a bevel on the end of the conductor 46. The conductors 46 are then moved longitudinally with respect to the enclosure 54 such that an equal amount of each conductor 46 extends past each end of the enclosure 54, thereby forming the male connectors 56. The plugs 94 are then reinstalled within the hollow interior 90 of the support member 78, thereby forcing the conductors 46 into the pockets 74. This effectively locks the conductors 46 within the enclosure 54, thereby preventing longitudinal movement of the conductors 46 with respect to the enclosure 54.

Figure 8:
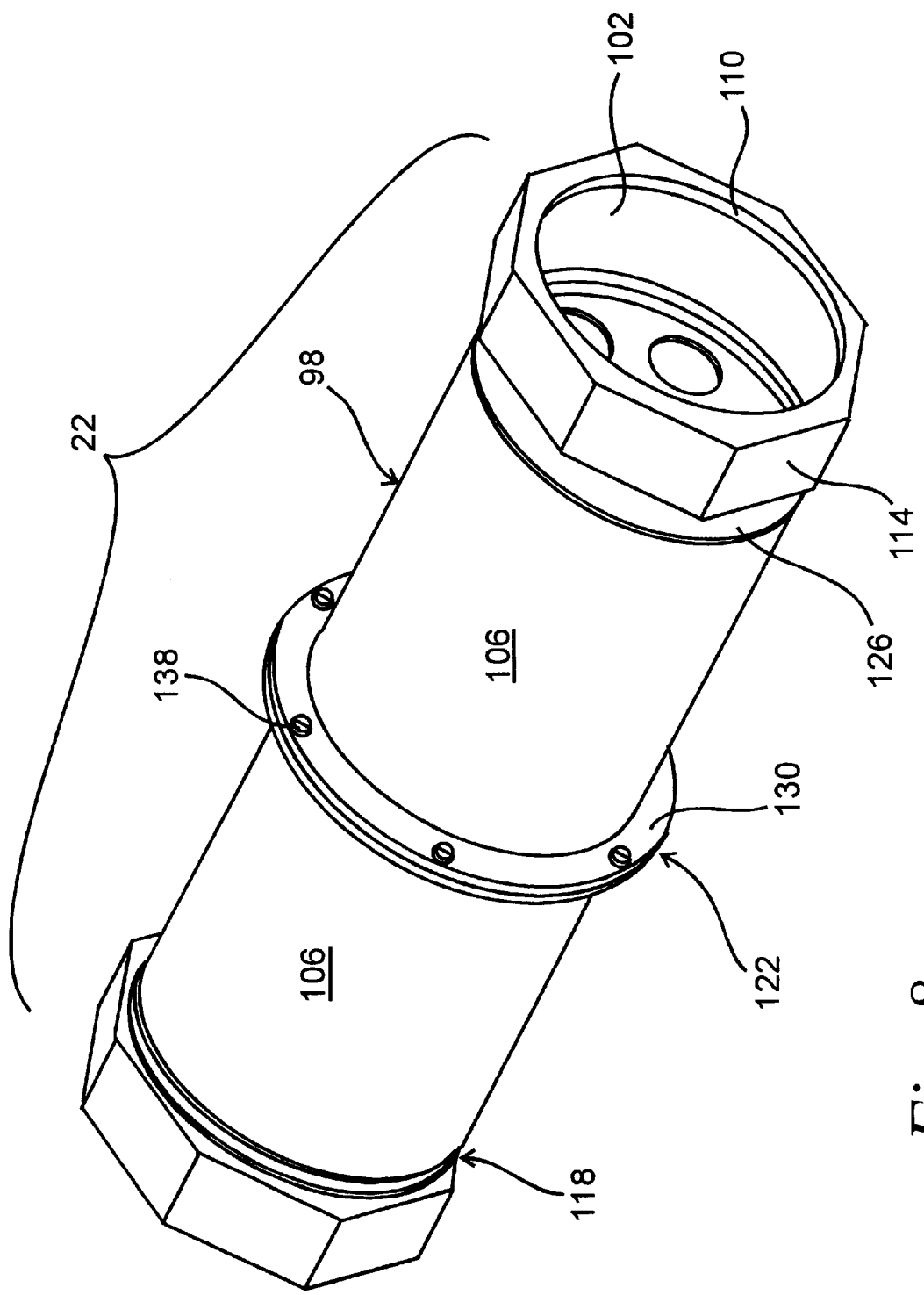
FIG. 8 is an isometric view of an assembled joint connector of the present invention.
Figure 9:
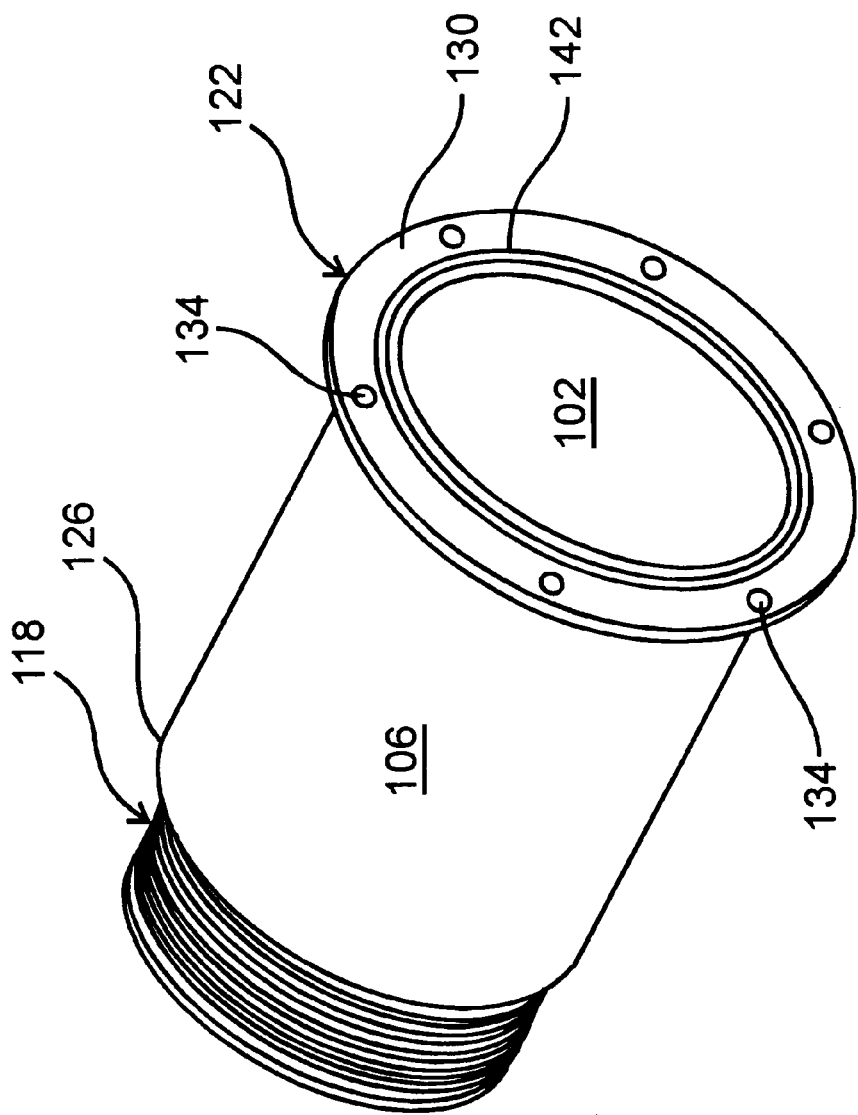
FIG. 9 is an isometric view of one half of the joint connector housing of the present invention.

Referring again to FIG. 1, it can be seen that adjacent ends of the first and second sections, 14 and 18, respectively, are electrically and mechanically connected by the connector 22. The connector 22, as illustrated in FIG. 8, generally includes a connector housing 98 which is generally hollow and defines a housing passage 102 for receiving the adjacent ends of the first and second sections, 14 and 18, respectively. The connector housing 98 is made from two substantially identical halves. At each end of the connector housing 98, a compression washer 110 is held in place by a compression nut 114. As shown in FIG. 9, each housing half 106 has a threaded end portion 118 that threadably receives one of the compression nuts 114 and a flanged end portion 122. The threaded end portion 118 stops at a step 126 in the housing half 106. The step 126 defines a change in the diameter of the housing passage 102 such that the diameter at the threaded end portion 118 is smaller than the diameter at the flanged end portion 122. Each flanged end portion 122 has a circumferentially extending flange 130 which includes a number of apertures 134 spaced at intervals around the flange 130 for receiving assembly hardware such as screws 138 or rivets. Each flange 130 also includes a sealing groove 142 located inward from said apertures 134. The sealing groove 142 receives a sealing ring 146, shown in FIG. 11, which is compressed between the two halves 106, thereby sealing the connector housing 98 against the ingress of liquids.

Figure 10:
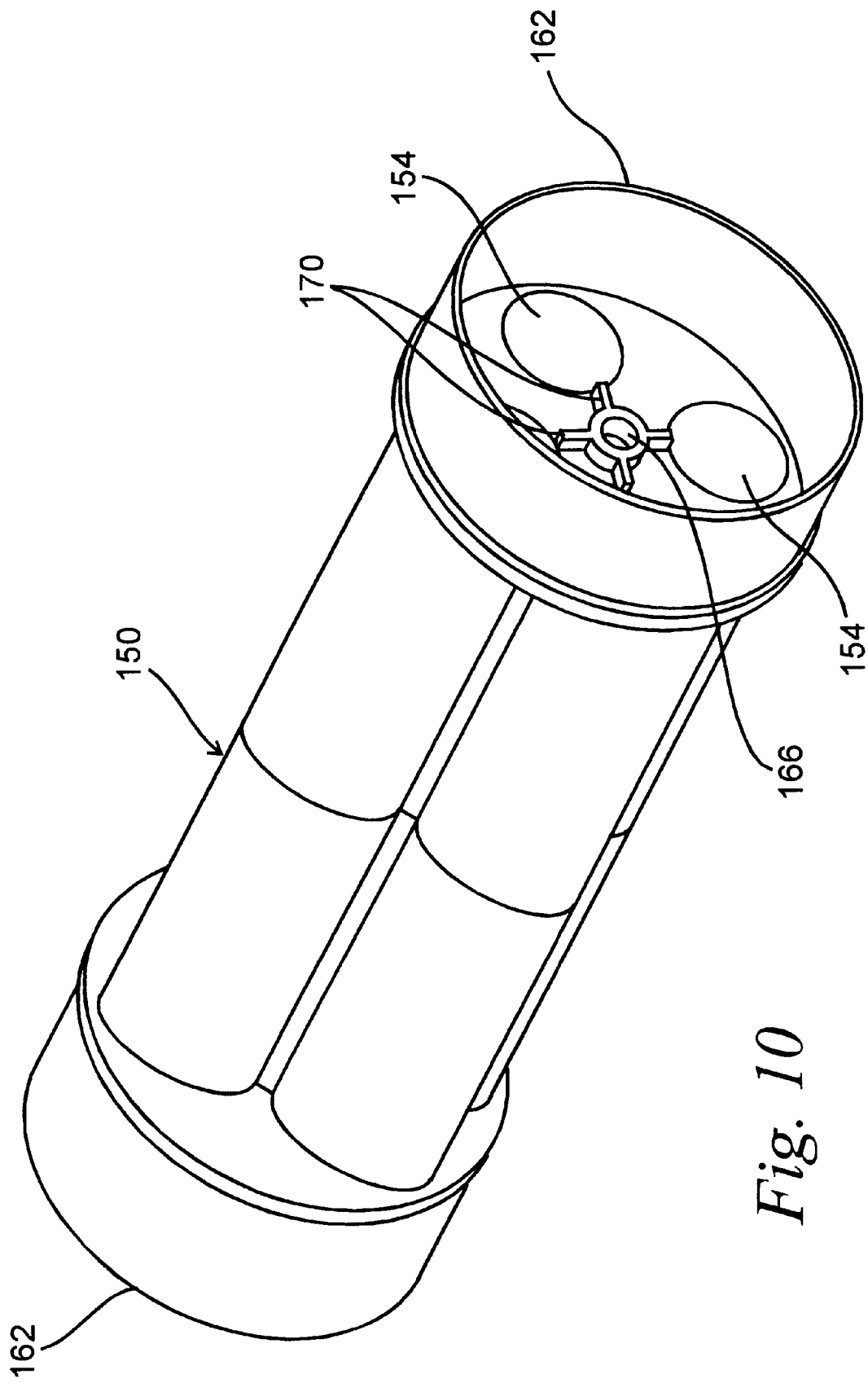
FIG. 10 is an isometric view of an insulating member, constructed in accordance with the present invention.

Referring now to FIG. 10, an insulating member 150 is contained within the housing passage 102 such that it is retained between the steps 126. The insulating member 150 defines a number of passages 154 passing longitudinally through the insulating member 150 and arranged in a uniform pattern corresponding to the uniform cross-section of the male connectors 36 and 56 of the first and second pre-bussed rigid conduit sections, 14 and 18, respectively.

Each passage 154 is dimensioned to snugly receive an electrical connector 158. Each insulating member 150 also includes a circumferential lip 162 extending outwardly from each end, a retaining aperture 166 aligned along its longitudinal axis and a number of alignment ribs 170 extending radially outward from the retaining aperture 166.

Figure 13:
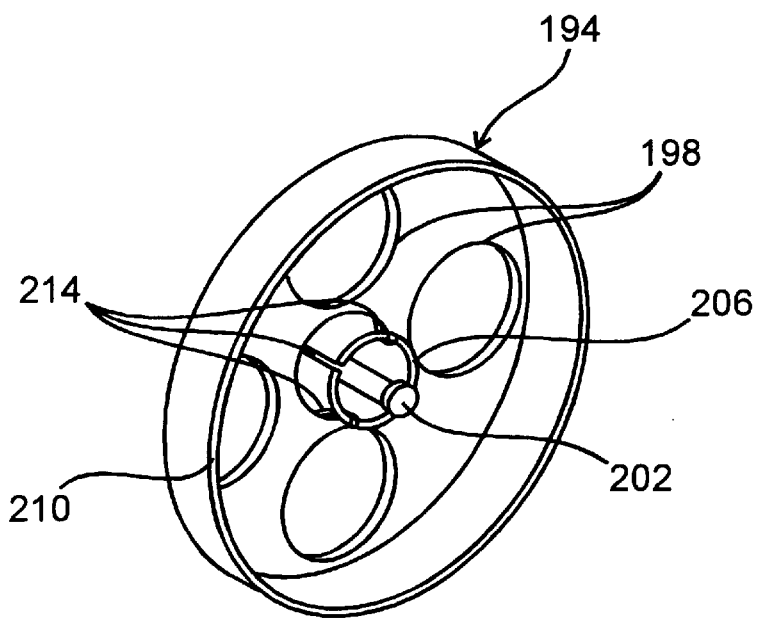
FIG. 13 is an isometric view of an end stop constructed in accordance with the present invention.
Figure 14:
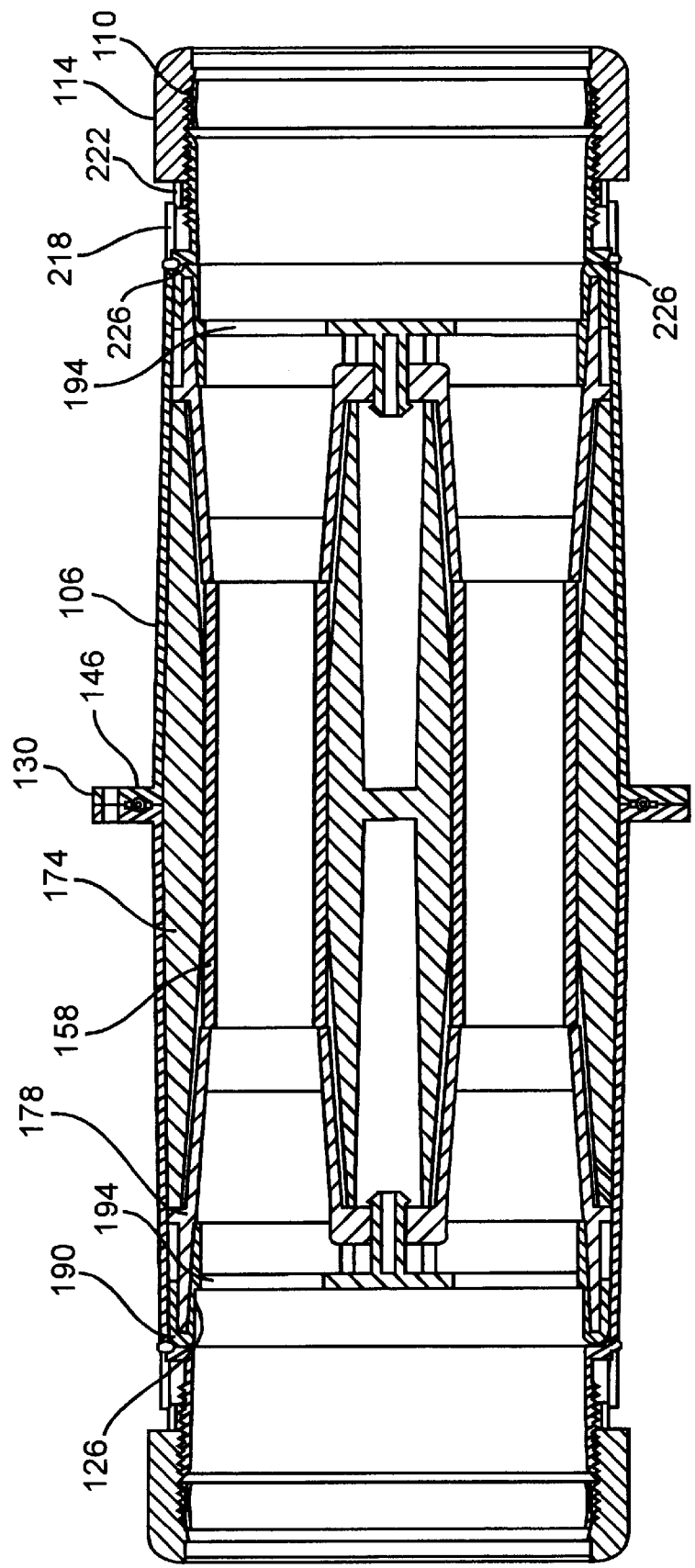
FIG. 14 is a cross-sectional view of the joint connector of FIG. 11.
Figure 15:
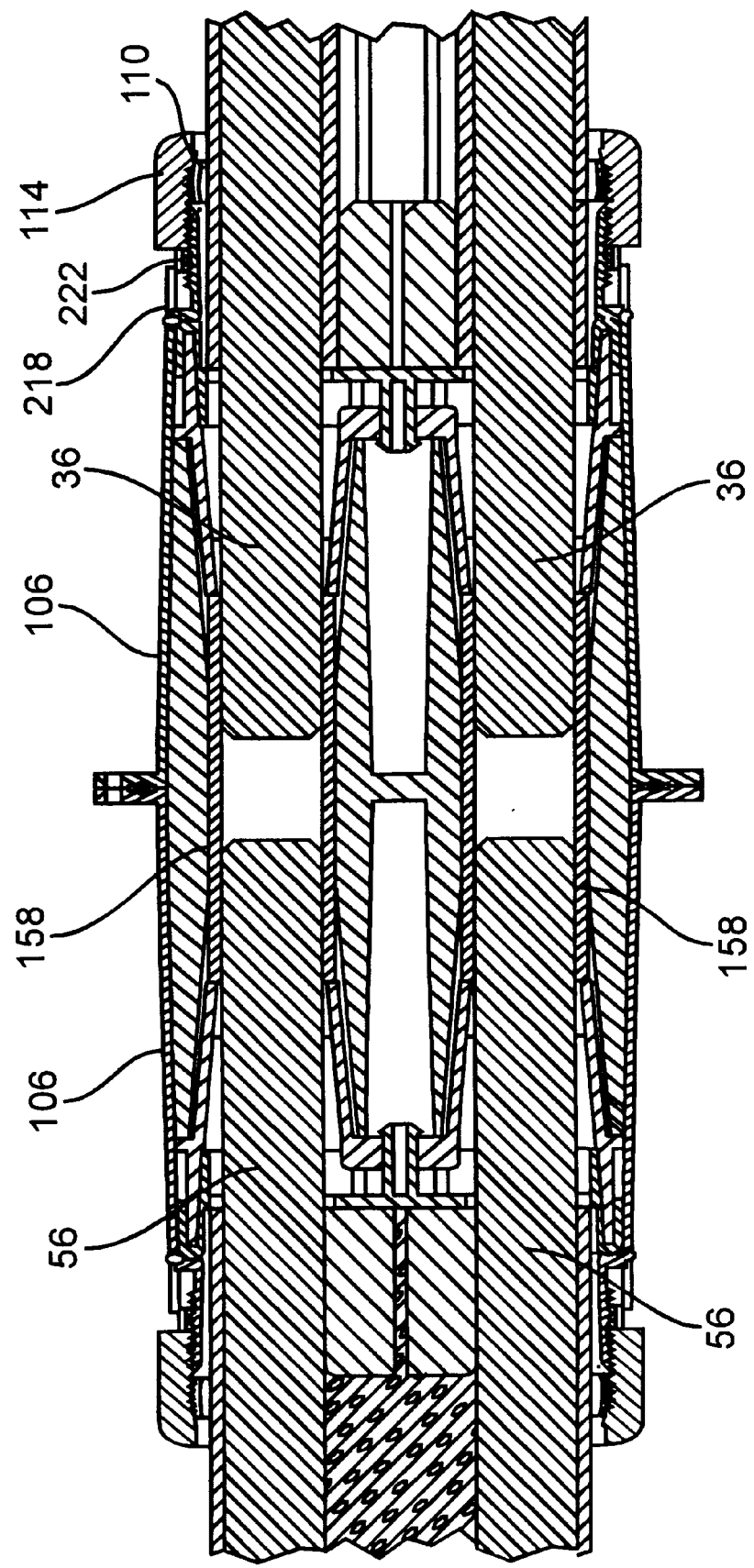
FIG. 15 is a cross-sectional view of a joint connector installed between a standard section and a field modifiable section of the distribution system as shown in FIG. 1 in accordance with the present invention.

The insulating member 150 preferably includes three parts, a middle insulator 174 and two generally identical end insulators 178. The middle insulator 174 includes the passages 154 of the insulating member 150 that have a generally cone-like end portion at each end and are dimensioned to snugly but slidably receive the electrical connectors 158 at their middle. Each end insulator 178, as shown in FIG. 13, includes the circumferential lip 162, retaining aperture 166 and alignment ribs 170 of the insulating member 150. Each end insulator 178 also has a number of generally cone-like projections 182 extending from the side opposite the circumferential lip 162, each projection 182 ending at a distal end 186. The projections 182 are arranged in the same pattern as the passages 154 such that one projection 182 is slidably received within each cone-like end portion of one of the passages 154. The distal ends 186 of the projections 182 are in juxtaposed relation to the ends of the electrical connectors 158 such that the electrical connectors 158 can not move longitudinally within the passages 154. A generally U-shaped gasket 190 is received over the end of each lip 162 such that, when the housing halves 106 are assembled, as best shown in FIG. 14, the gaskets 190 will engage the steps 126 of each housing half 106, effecting a liquid tight seal between the threaded end portions 118 of the connector housing 98 and the insulating member 150. As shown in FIG. 15, the gaskets 190 also engage the inserted ends of the first and second pre-bussed rigid conduit enclosures, 14 and 18, respectively, effecting a liquid tight seal between the enclosures 34 and 54 and the connector housing 98.

Figure 11:
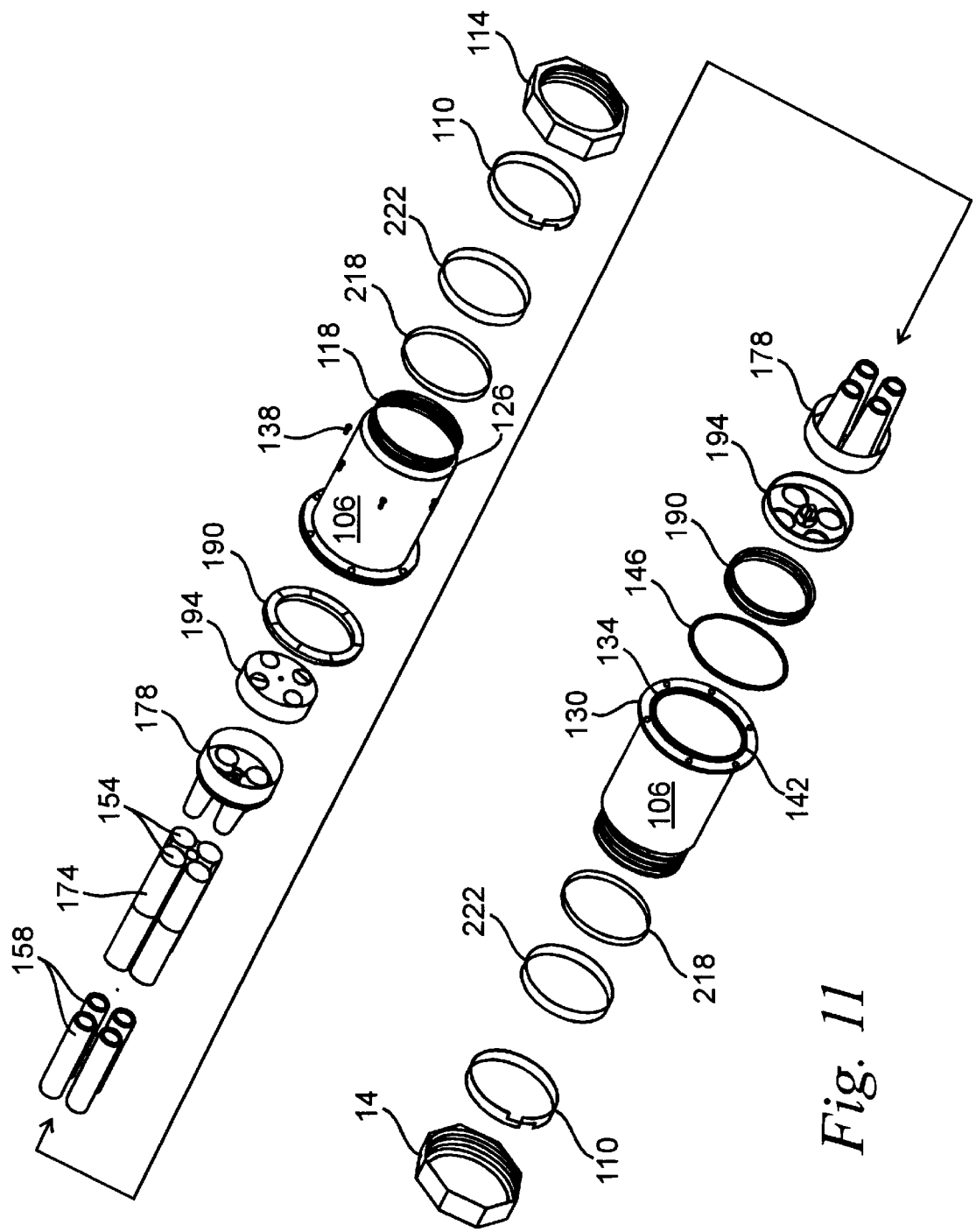
FIG. 11 is an exploded view of the joint connector of FIG. 8.
Figure 12:
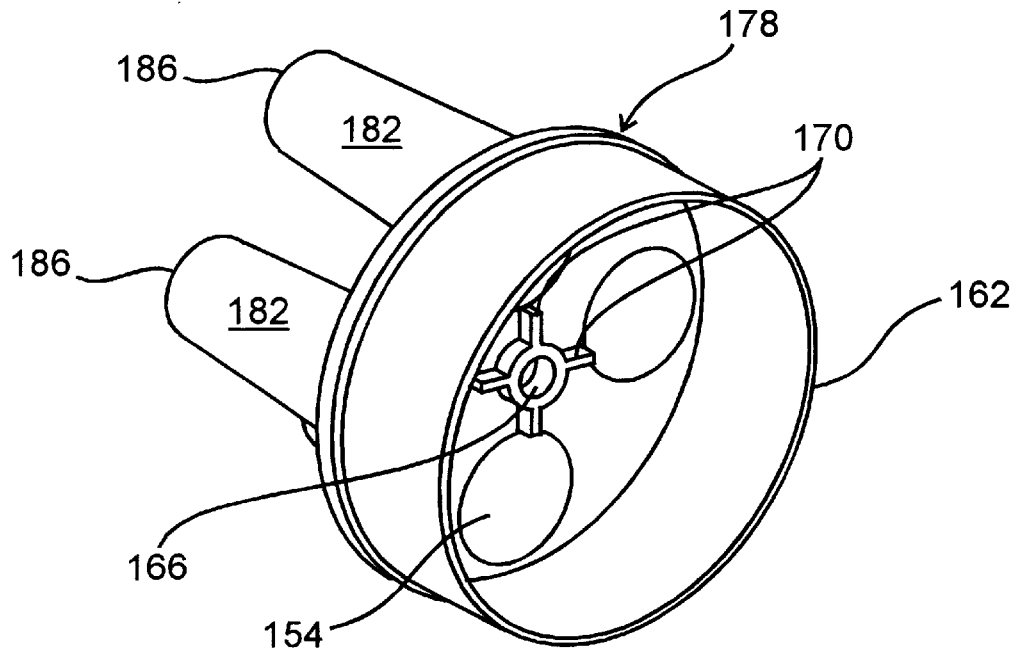
FIG. 12 is an isometric view of an end insulator constructed in accordance with the present invention.

The electrical connectors 158, shown in FIG. 11, make the electrical connections between conductors 26 of the first section 14 and conductors 46 of the second section 18. Each electrical connector 158 is generally tubular in shape, defining a female member dimensioned to snugly but slidably receive the male connectors 36 and 56 of first and second sections, 14 and 18, respectively.

An end stop 194, as shown in FIG. 13, is provided at each end of the insulating member 150. The end stops 194 provide a positive stop for preventing the adjacent ends of first and second sections of pre-bussed rigid conduit, 14 and 18, respectively, from entering the connector 22 too far during the installation of a pre-bussed rigid conduit electrical distribution system 10. Each end stop 194 is generally flat and circular in shape and includes a number of apertures 198 corresponding in location and number to the pattern of male connectors 36 and 56, a retaining nipple 202 extending outwardly from one side along its longitudinal axis, an alignment ring 206 also extending outwardly from the same side and being generally concentric about the retaining nipple 202, and a circumferential flange 210 also extending from the same side as the retaining nipple 202. The retaining nipple 202 is received in the retaining aperture 166 of the end insulator 178 by a snapping action such that it retains the end stop 194 to the end insulator 178. The alignment ring 206 includes a number of slots 214 corresponding to the alignment ribs 170 of the end insulator 186. Each alignment rib 170 is received in one of the alignment slots 214, preventing rotational movement of the end stop 194 with respect to the insulating member 150, such that the apertures 198 maintain alignment with the passages 154 in the insulating member 150. The end stops 194 are made of a material having sufficient rigidity to provide a positive stop for the ends of the first and second sections of pre-bussed rigid conduit, 14 and 18, respectively, and are inserted into the connector 22 during assembly. The material also has sufficient flexibility to allow slight compression of the end stops 194 due to linear expansion of sections of the pre-bussed rigid conduit, such as sections 14 and 18, caused by temperature increases resulting from normal operation of the electrical distribution system. A material having a Shore A Scale hardness of 70±15 has been found to work well in this application.

The connector 22 also has a tightness indicator that indicates the state of tightness of the compression nuts 114. The tightness indicator includes a first indicating ring 218 which is concentric about and spaced apart from the threaded end portion 118 of the connector housing 98 and a second indicating ring 222. The first indicating ring 218 abuts the step 126 which can have a ridge 226 for maintaining the spacing between the first indicator ring 218 and the threaded end portion 118. The second indicating ring 222 is also concentric about the threaded end portion 118 of the connector housing 98, but fits snugly against the threads such that it does not move easily. The second indicating ring 222 is also dimensioned to be slidably received between the threaded end portion 118 and the first indicating ring 218. During the installation of a pre-bussed rigid conduit electrical distribution system 10, the compression nuts 114 must be tightened sufficiently to cause the compression washers 110 to be compressed tightly about the enclosures 34 and 54 of the adjacent first and second sections, 14 and 18, respectively. As shown in FIG. 14, prior to tightening the compression nuts 114, both first and second indicating rings, 118 and 222, are clearly visible. As the compression nuts 114 are threadably received on the threaded end portions 118, the compression nuts 114 push the second indicating rings 222 inward and under the first indicating rings 218. When proper tightening of the compression nuts 114 has been attained, as shown in FIG. 15, the second indicating ring 222 is no longer visible. The second indicating ring 222 should be of a color having high visibility from a distance. This permits one to visually check the state of tightness of compression nuts 114 located in areas that are difficult to access and check manually. In the preferred embodiment, the second indicating rings 222 are red.

As an alternative to the joint connector 22 of FIG. 8, a bolted joint connector as described and claimed in U.S. Pat. App. Ser. No. (Docket No. OXF-22), filed concurrently herewith, and entitled BOLTED ELECTRICAL CONNECTING DEVICE FOR MULTIPLE ELECTRICAL CONDUCTORS, can be used for connecting two adjacent sections, 14 and 18 of pre-bussed rigid conduit together.

We claim:

1. A section of pre-bussed rigid conduit, comprising in combination:

a substantially rigid enclosure extending along a longitudinal axis between a first end region and a second end region, said enclosure including a plurality of pockets each extending along said longitudinal axis between said first and second end regions, said enclosure having a uniform cross-section along its extent;

a plurality of substantially rigid conductors each being received within one of said pockets of said enclosure, said plurality of conductors extending from said first end region of said enclosure to said second end region of said enclosure;

a preliminary support member, said preliminary support member being positioned centrally between and generally tangential to each of said plurality of substantially rigid conductors thereby forcing said conductors into said pockets;

a permanent support member for supporting said plurality of conductors along their entire length within said enclosure and separating said plurality of conductors one from another; and said plurality of conductors forming a pattern that is uniform in cross-section along the length of said section such that said plurality of conductors form a pattern of extending male connectors at each end of said section.

2. The section of pre-bussed rigid conduit of claim 1 wherein said preliminary support member further includes:

a plurality of plugs, one being pressed into each of said first and second end regions of said enclosure such that each said plug simultaneously engages all of said plurality of conductors thereby simultaneously forcing each of said plurality of conductors into an associated said pocket.

3. The section of pre-bussed rigid conduit of claim 2 wherein said permanent support member is an expandable closed cell foam.

4. The section of pre-bussed rigid conduit of claim 3 wherein said closed cell foam is foamed in place after said substantially rigid conductors have been forced into said associated pockets by said preliminary support member, said closed cell foam bonding said substantially rigid conductors to said substantially rigid enclosure along their entire length.

5. A section of pre-bussed rigid conduit, field-alterable by cutting the section across its length in order to join it with an additional section to form an electrical distribution system, comprising in combination:

a substantially rigid enclosure extending along a longitudinal axis between a first end region and a second end region, said enclosure including a plurality of pockets each extending along said longitudinal axis between said first and second end regions, said enclosure having a uniform cross-section along its extent;

a plurality of substantially rigid conductors each being received within one of said pockets of said enclosure, said plurality of conductors extending from said first end region of said enclosure to said second end region of said enclosure;

a support member extending along a longitudinal axis for supporting said plurality of conductors along their entire length within said enclosure and separating said plurality of conductors one from another, said support member supporting said plurality of conductors such that said plurality of conductors are selectively longitudinally movable with respect to said enclosure, said support member being substantially rigid and circumferentially expandable for selectively locking said conductors within said pockets by applying an expanded means; and said plurality of conductors forming a pattern that is uniform in cross-section along the length of said section such that said plurality of conductors form a pattern of extending male connectors at each end of said section and form the same pattern of extending male connectors if said section is field-altered by cutting the section across its length.

6. The section of pre-bussed rigid conduit of claim 5 wherein said support member comprises a perimeter structure defining a hollow interior extending along said longitudinal axis.

7. The section of pre-bussed rigid conduit of claim 6 wherein said support member further includes:

a pair of plugs, one being pressed into said hollow interior at each end of said support member causing said support member to expand circumferentially thereby locking said conductors into said pockets of said enclosure preventing longitudinal movement with respect to said enclosure.

8. The section of pre-bussed rigid conduit of claim 6 wherein said perimeter structure further defines a plurality of alternating peaks and valleys corresponding to the number of said plurality of conductors, said peaks and valleys extending along said longitudinal axis of said support member.

9. The section of pre-bussed rigid conduit of claim 8 wherein each of said plurality of conductor nests within one of said valleys and one of said peak separates two adjacent conductors.

10. An electrical joint connector comprising:

a first end portion of a first section of a sectionalized electrical distribution system, said first end portion including a first enclosure end and a first plurality of electrical conductor ends forming a pattern that is uniform in cross-section along the length of said first section such said first plurality of electrical conductors form a first pattern of extending male connectors;

a second end portion of a second section of the sectionalized electrical distribution system, said second end portion including a second enclosure end and a second plurality of electrical conductor ends forming a pattern that is uniform in cross-section along the length of said second section such said second plurality of electrical conductors form a second pattern of extending male connectors;

a connector housing, said housing defining a passage dimensioned to snugly receive said first and second enclosure ends;

an insulating member being contained within said passage of said connector housing, said insulating member defining a plurality of connector passages being arranged in a pattern complementary to said patterns of said first and second male connectors;

a plurality of electrical connectors, each being slidably received within one of said connector passages of said insulating member, each said connector defining a female member for slidably receiving one of said first male connectors and one of said second male connectors such that an electrical connection is made between said first and second sections of the electrical distribution system;

a pair of end stops, one being attached to each end of said insulating member thereby providing a positive stop for said first and second enclosure ends;

means for mechanically connecting said first and second enclosure ends to said connector housing; and means for sealing between said connector housing and said first and second enclosure ends for preventing the ingress of liquids.

11. The electrical joint connector of claim 10 wherein said connector housing further comprises:

two housing halves being generally identical in shape, each having a threaded end portion, a flanged end portion and a step immediately adjacent said threaded end portion, said threaded end portion defining an aperture dimensioned to receive said first and second enclosure ends and said flanged end portion defining an aperture dimensioned to receive said insulating member.

12. The electrical joint connector of claim 11 wherein said flanged end portions of each said connector housing half further comprises:

a circumferentially extending flange, said flange including a plurality of apertures for assembling said housing halves one to the other and a circumferential sealing groove located inward from said apertures.

13. The electrical joint connector of claim 12 wherein said sealing means further comprises:

a sealing ring, said sealing ring being received within said sealing groove of said flange such that when said flanges are assembled together said sealing ring will be compressed thereby effecting a liquid tight seal between said flanges.

14. The electrical joint connector of claim 11 wherein said means for mechanically connecting said first and second enclosure ends to said connector housing comprises:

a pair of compression washers; and a pair of compression nuts, said washers and said nuts being slidably received on said first and second enclosure ends such that as said washers are threadably received on said threaded end portions of said connector housing said compression washers are tightly compressed about said enclosure ends.

15. The electrical joint connector of claim 10 wherein said insulating member defines a retaining aperture at each end, said aperture being aligned along the longitudinal axis of said insulating member, said insulating member further comprising:

a plurality of alignment ribs extending radially outward from each said retaining aperture; and a circumferential lip extending outwardly from each end of said insulating member.

16. The electrical joint connector of claim 15 wherein said insulating member further comprises:

a middle insulator wherein each end of said connector passage is generally cone-shaped in cross-section; and a pair of end insulators, one being placed at each end of said middle insulator, each said end insulator having cone-like projections, one said projection being received within each said cone-shaped cross-section of said connector passage, said end insulator including said retaining aperture, said alignment ribs and said circumferential lips.

17. The electrical joint connector of claim 15 wherein each said end stop defines a plurality of holes arranged in a pattern complementary to said patterns of said first and second male connectors; said end stop further comprises:

a retaining nipple for being received in said retaining aperture of said insulating member thereby securing said end stop to said insulating member; and an alignment ring being concentric about said retaining nipple and having slots for engaging said alignment ribs of said insulating member.

18. The electrical joint connector of claim 10 wherein said end stops are made from a material having sufficient rigidity to provide a positive stop to said end portions of said first and second sections during installation of the distribution system and having sufficient flexibility to permit slight compression of said end stop due to linear expansion of said first and second sections caused by temperature increases resulting from normal operation of the energized distribution system.

19. The electrical joint connector of claim 10 wherein said means for sealing between said connector housing and said first and second enclosure ends comprises a pair of gaskets each being generally U-shaped in cross-section, each said gasket being slidably received over said circumferential lip of said insulating member such that as said connector housing halves are assembled together said gasket is compressed between said steps of said connector housing and said circumferential lip of said insulating member thereby effecting a liquid tight seal between said housing and said insulating member, and wherein said enclosure ends of said first and second sections are snugly and slidably engaged by said gasket such that a liquid tight seal is also effected between said connector housing and said enclosure ends.

20. The electrical joint connector of claim 14 wherein said joint connector further includes means for visibly indicating tightness of said compression washers.

21. The electrical joint connector of claim 20 wherein said visible tightness indicator further comprises:

a first tightness indicating ring being concentric about and spaced apart from said threaded end portion and abutting said step; and a second tightness indicating ring being concentric about said threaded end portion and snugly but slidably received between said first indicating ring and said threaded end portion such that as said compression nut is threadably engaged on said threaded portion said second indicating ring is urged between said first indicating ring and said threaded portion.

22. The electrical joint connector of claim 21 wherein both said first and second indicating rings are visible before tightening said compression nut.

23. The electrical joint connector of claim 22 wherein after tightening said nut such that said compression washer is sufficiently compressed about said housing end said second indicating ring is no longer visible.

24. The electrical joint connector of claim 21 wherein said second indicating ring is of a particular color of high visibility.

25. The electrical joint connector of claim 24 wherein said second indicator ring is red in color.

* * * * *